United States Patent [19]

Witty

[11] Patent Number: 4,537,481
[45] Date of Patent: Aug. 27, 1985

[54] PROCESS AND APPARATUS FOR CREATING TRAVELING MATTES

[76] Inventor: Craig D. Witty, 645 Ash St., Winnetka, Ill. 60093

[21] Appl. No.: 438,165

[22] Filed: Nov. 1, 1982

[51] Int. Cl.³ .......................... G03B 21/32; A63J 5/00
[52] U.S. Cl. ...................................... 352/89; 352/47; 352/87
[58] Field of Search .................. 352/46, 47, 87, 89

[56] References Cited

U.S. PATENT DOCUMENTS

| | | | |
|---|---|---|---|
| 2,727,427 | 12/1955 | Jenkins | 352/89 |
| 2,730,565 | 1/1956 | Owens | 352/47 |
| 3,034,406 | 5/1962 | McKenzie et al. | 352/89 |
| 3,037,422 | 6/1962 | Haynes | 352/46 |
| 3,190,955 | 6/1965 | Maurer | 352/87 |
| 3,731,995 | 5/1973 | Reiffel | 352/87 |
| 4,093,371 | 6/1978 | Agliata | 352/89 |
| 4,111,536 | 9/1978 | Taylor | 352/89 |

FOREIGN PATENT DOCUMENTS 885709 9/1943 France ............................ 352/89

*Primary Examiner*—Monroe H. Hayes
*Attorney, Agent, or Firm*—McDougall, Hersh & Scott

[57] ABSTRACT

A method and apparatus for creating traveling mattes in which a first image is photographed and then sensed. The first image is then electronically processed followed by the steps of photographing on the same film a successive image and simultaneously transmitting to a light valve an electronic signal to produce a high-contrast negative image corresponding to the first image so that the successive image is combined with the first image.

9 Claims, 6 Drawing Figures

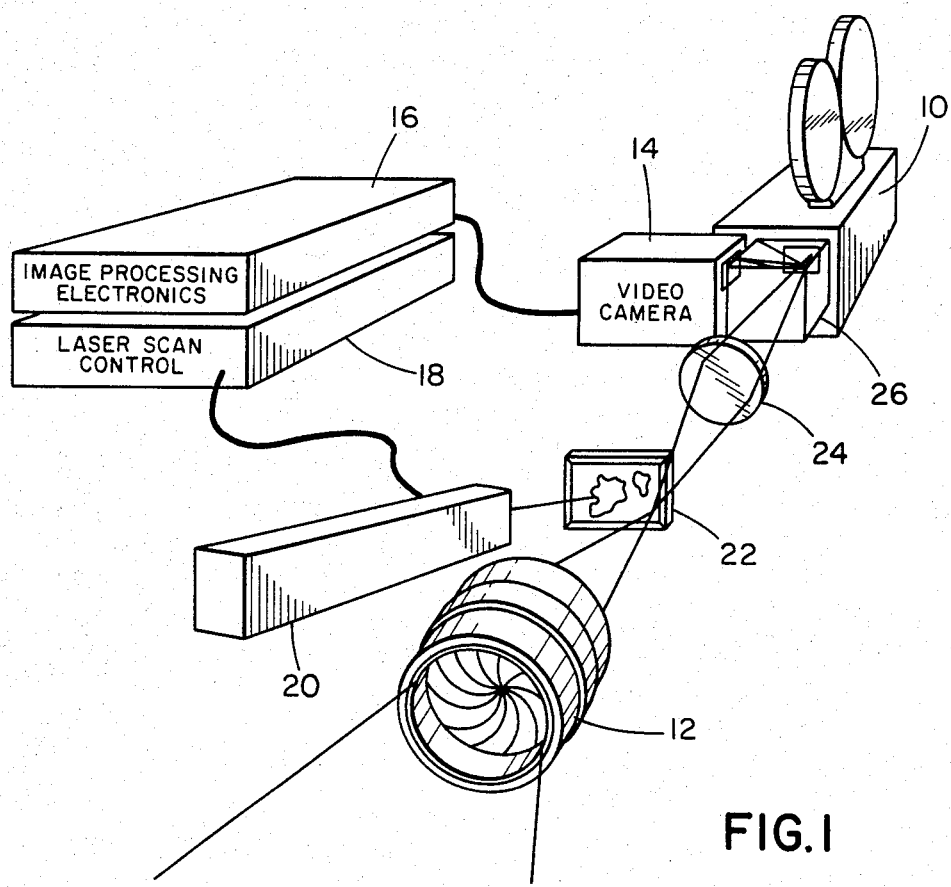
FIG.1
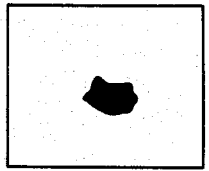
MATTE FROM
FIRST IMAGE
USED WITH 2ND
SUBSEQUENT
IMAGE ON SAME
FRAME OF FILM
FIG.2
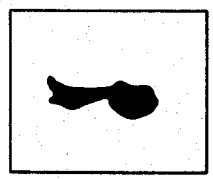
MATTE FROM
FIRST AND
SECOND IMAGES
USED WITH 3RD
SUBSEQUENT
IMAGE ON SAME
FRAME OF FILM
FIG.3
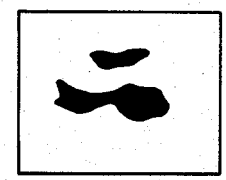
MATTE FROM
1ST, 2ND & 3RD
IMAGES
USED WITH 4TH
SUBSEQUENT
IMAGE ON SAME
FRAME OF FILM
FIG.4
ETC.
FIG.5

PROCESS AND APPARATUS FOR CREATING TRAVELING MATTES

This invention relates to cinematography, and more particularly to an improved method and apparatus for creating special effects and rephotographing images.

Special effects in the motion picture industry have been growing by leaps and bounds in recent years, particularly with the popularity of science fiction films such as *Star Wars, Close Encounters Of The Third Kind, Star Trek, The Movie, Superman,* and the like. The current techniques used in the creation of special effects have become known as the blue-screen traveling-matte process in which a foreground image in front of an intensely blue background is first photographed, and then combined with a background image with the aid of opaque male and female mattes positioned to mask the foreground and background images so that each can be printed separately onto a single combined negative. The so-called traveling matte, or "T-M process" is now well known in the literature, and is described, for example, by Samuelson in *American Cinematographer,* (May and June, 1982).

One of the most significant disadvantages of the blue-screen T-M process is that separate mattes, both male and female, must be produced for each frame where the images present on each frame are to be portrayed in motion. These mattes are produced through a series of complex and time consuming manipulations by the film processing labs. Thus, in complex special effects scenes, such as those involving a space ship traveling through a group of asteroids, it can be necessary to employ hundreds of mattes, each of which is prepared for each frame of the scene. As those skilled in the art will appreciate, the film is developed, then the mattes are produced using complex processing and printing operations, and then the mattes must be aligned with the original film to accurately block out certain of the images—a formidable task in its own right. Then after the mattes are properly positioned, the entire sequence must be rephotographed, combining all the separate elements of the scene. Each time that scene is rephotographed, there is noticeable image degradation.

It is accordingly an object of the present invention to provide a traveling matte process and apparatus therefor which overcomes the foregoing disadvantages.

It is a more specific object of the present invention to provide a traveling matte process and apparatus therefor which can be used to create special effects in cinematography without having to separately prepare film mattes for the images to be combined.

It is yet another object of the invention to provide apparatus for use in the traveling matte process in which mattes to block out images to be combined are prepared instantaneously by electronic means.

It is a related object of the invention to provide a traveling matte process and apparatus therefor in which the contrast of an image to be rephotographed is more precisely controlled.

These and other objects of the invention will appear more fully hereinafter, and, for purposes of illustration, but not of limitation, embodiments of the present invention are shown in the accompanying drawings wherein:

FIG. 1 is a schematic view illustrating the process and apparatus of the present invention;

FIG. 2 is a representative illustration of a matte produced electronically in accordance with the present invention for a first image;

FIG. 3 is a representative illustration of a matte produced electronically in accordance with the present invention for a second image;

FIG. 4 is a representative illustration of a matte produced electronically in accordance with the present invention for a third image; and FIG. 5 is a representative illustration of a matte produced electronically in accordance with the present invention for a successive image.

Figure 6:
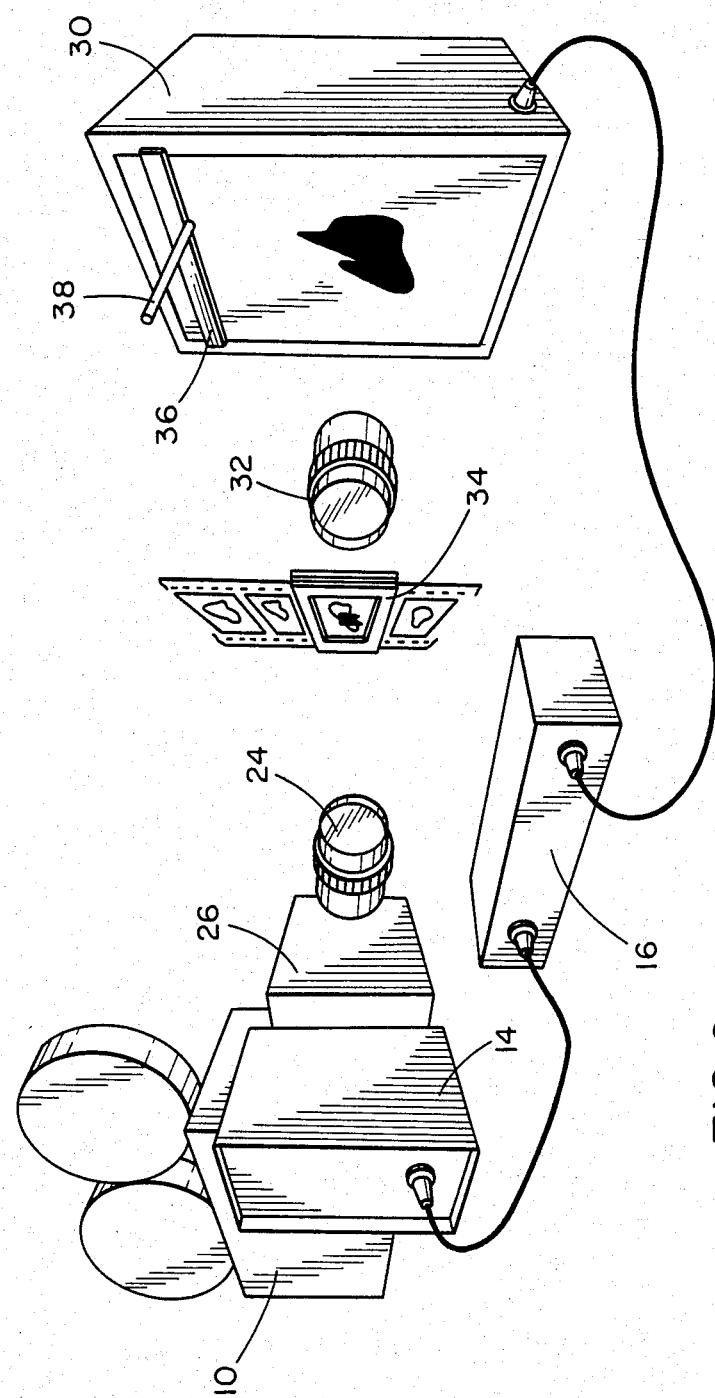
FIG. 6 is a schematic view illustrating an alternate embodiment of the process and apparatus of the present invention.

The concepts of the present invention reside in apparatus and a process for use in cinematography wherein mattes for the purpose of blocking out selective images are created electronically and then used, where desired, consequently thereafter in the rephotographing of the scene, as in the creation of special effects. In accordance with the invention, use is made of a light valve to selectively modulate light received by, for example, a photographic camera and thereby creating a matte for selectively blocking out images from the scene.

The apparatus and method of the present invention find particular application in creating combined images in cinematography. A first image is photographed with, for example, a photographic camera. At about the same time that the first image is photographed, the same image is sensed by electronic means, such as a video camera. The electronic signal from the video camera is then processed and, after the film is rewound, used to actuate a light valve, thus producing a negative silhouette corresponding to the first image. The light valve thus generates a matte blocking out the area on the photographic film where the first image has already been recorded, while a subsequent image is simultaneously photographed on the same film. Thus, the concepts of the present invention make it possible to combine the first and successive images on a single film without the need to prepare separate film mattes and the difficulties attendant therewith. The method and apparatus of the present invention thus eliminate the delays encountered in the blue-screen traveling matte process.

The concepts of the present invention can also be used to control the contrast in images to be photographed, and more importantly, rephotographed.

Referring now to FIG. 1 for a detailed description of an illustrative embodiment of the present invention, there is shown a photographic recording device 10, such as a conventional motion picture camera or preferably a special effects motion picture camera positioned to photograph an image not shown on the drawing. Associated with the camera 10 is a camera lens 12 which is positioned to receive the image. Also associated with the camera 10 is an electronic image sensing device 14, which is preferably a high resolution, black-and-white, video camera. The video camera 14 has its output connected to image processing and/or recording electronics, illustrated generally as 16, whose output is in turn operatively connected to a laser scan control 18 as more fully described hereinafter. The output of the laser scan control is operatively connected to a source of electromagnetic energy, and preferably a laser 20.

The laser 20 is positioned to control a light valve 22 which is positioned in the optical path between the lens and the camera 10. The light valve is at an aerial-image plane in the optical path. In cases where the light valve 22 is spaced along the optical path from the camera 10, it is desirable to employ a re-imaging lens 24 to relay the image to the film plane. The film camera 10 and the video camera 14 are each associated with a device 26 for transmitting to the video camera the same image as that transmitted to the film camera 10. In the preferred embodiment of this invention, use is generally made of a beam separating prism, well known to those skilled in the art. Alternatively, use can also be made of an indexing mirror or a rack-over mechanism for displacing the film camera and positioning the video camera in its place. Both of those systems are equally well known in the art of cinematography.

As noted above, the apparatus of the present invention is particularly well suited for creating combined images in cinematography. In that application, a first image is placed in the optical path in front of the lens 12 and is photographed by the film camera 10 in accordance with conventional techniques. That first image is also, and generally simultaneously, received by the video camera 14 by the, for example, beam splitting prism 26. The electronic signal generated by the video camera 14 in accordance with well known electronic principles is conducted to an image processing electronics assembly 16 wherein it is processed, and in some cases stored in memory storage devices which form no part of the present invention. After the first image is recorded, the film is rewound in preparation for the addition of a subsequent image, and the electronic signal is recalled from the memory device. The signal thus processed in the image processing device 16 is used to control the laser 20 which in turn emits, for example, infrared electromagnetic radiation which impinges on the light valve 22.

In this preferred embodiment, the light valve 22 is a smectic liquid crystal light valve such as that marketed by Singer/Librascope and described in *Electro-Optical Systems Design*, (May, 1982, pp. 9–10).

The electromagnetic radiation emitted by the laser 20 is, under the laser scan control electronics 18, directed to the liquid crystal light valve only in those areas occupied by the first image. The light valve, under the stimulus of the electromagnetic radiation, in those areas corresponding to the areas occupied by the first image, becomes opaque and scatters the transmitted light. Thus, the laser 20 traces on the liquid crystal light valve a matte corresponding to the first image.

As illustrative of the concepts of the invention, consider the scene of two spaceships moving past two asteroids, a large one and a small one. The first image to be photographed, in accordance with generally known principles of cinematography, is the closest foreground image, in this case the large asteroid. The large asteroid is thus photographed by the film camera 10 and the image of the large asteroid is received by the video camera 14. The signal from the video camera 14, after processing by the image processing electronics 16, is stored in the memory of the image processing electronics 16. After the completion of the filming of the first image, the second image, in this case, a large spaceship passing behind the large asteroid, is filmed by the film camera 10. Simultaneously with the filming of the second image, the large spaceship moving behind the large asteroid, the signal representing the image of the large asteroid is recalled from the memory of the image processing electronics 16 and, by means of the laser scan control electronics 18, is used to control the output of the laser 20 to form a matte or opaque silhouette corresponding to the silhouette of the first image, namely the large asteroid. That image, by way of illustration is shown in FIG. 2 of the drawings.

Thus, during the photography of the second image, the laser traces a silhouette of the first image on the light valve positioned in the optical path of the camera 10 so that those portions of the film corresponding to the areas occupied by the first image remain unexposed by the second image.

During the time that the second image, the large rocketship, is being photographed with the silhouette of the first image, that same image as received by the film camera 10 is also being received by the video camera 14 which senses the image and converts that image into an electronic signal which is processed and stored in the image processing electronics 16.

Next, the film camera 10 is rewound and used to photograph the third image, namely a small spacecraft passing behind both the large asteroid and the large spaceship. At the time that the small spacecraft is being filmed, both the signal representing the first image and the signal representing the second image are recalled from the memory of the image processing electronics 16, and through the laser scan control electronics 18, are used to control the laser 20 which traces on the light valve the silhouette of both the first image and the second image, that is the images of the large asteroid and the large spacecraft, to form a matte having the configuration shown in FIG. 3 of the drawings.

At the time that this exposure is being made, the same signal is sensed by the video camera which, during the next photography sequence displays a matte showing the three images, namely, the large asteroid, the large spaceship, and the small spaceship as shown in FIG. 4. Thus the process is repeated for each image sought to be combined.

Thus, because the film is rewound before beginning each exposure sequence of each additional image, each image is combined on the same length of film, all without having to have the film developed for each sequence as in the blue-screen traveling matte system of the prior art.

In accordance with another embodiment of the invention described briefly above, the concepts of the invention can be used to control the contrast in the photography and rephotography of a wide variety of images. The primary difference between the contrast-control technique and the combined images technique as described above resides in the fact that the signal from the video camera 14 is not stored in the memory device in the contrast control system. One other significant difference is that the silhouette produced by the laser acting upon the liquid crystal in the combined images technique described above forms what is known in the art as a high-contrast negative image, that is, it is an image in which the silhouette is highly opaque while the remaining portions of the light valve are highly transparent. In this embodiment, however, the laser is controlled such that there is produced a low-contrast negative image, that is to say, an image containing graduated levels of grey.

The use of the foregoing contrast control technique is particularly well suited for applications in which an image is being rephotographed, although it will be understood that the technique can also be used in the original photography of an image. As is well known in the art, the rephotography of an image inherently results in an increase in the contrast, that is to say, during rephotographing of an image, the lighter areas become lighter and the darker areas become darker. In accordance with existing practices, graduated negative film masks are prepared through a contact exposure with the original film such that the areas of high light transmission appear darker and the areas of low light transmission remain relatively undarkened. That technique, of course, requires similar tedious steps to the blue-screen traveling matte technique described above.

However, using the concepts of this invention, the same image received by the film camera 10 is received by the video camera 14 which converts the image into an electronic signal by means of image processing electronics 16. As the photography operation is being conducted, the signal, after processing in the image processing electronics 16, is applied to the laser through the laser scan control electronics 18, to form a low contrast negative mask on the liquid crystal light valve. Thus the rephotographing of the image by the film camera 10 with the low contrast negative image mask interposed in the optical path serve to control the contrast, thereby minimizing or substantially eliminating the build up of contrast as is conventionally experienced during the rephotographing of an image.

As will be appreciated by those skilled in the art, the transmission of the signal from the video camera 14 through the image processing electronics 16 and the laser scan control electronics 18 occurs in real time so that the low contrast negative mask is traced by the laser on the liquid crystal valve during the time that the film camera 10 is recording the image. Consequently, because the low contrast method of operation takes place in real time and the high contrast matte forming mode of operation is the result of the signals recalled from the memory, both techniques can be used simultaneously, thus permitting the matting of images at the same time that the contrast control is also being achieved.

The light valve, previously described as a smectic liquid crystal device, may, in another configuration, be a high-resolution graphic plotter device if the function of the system is limited to compositing images that already exist on a transparent photographic medium such as pre-existing lengths of motion picture film. FIG. 6 illustrates such an embodiment of the present invention. In this configuration the surface of the paper (or similar suitable material) in the plotter 30 is strongly illuminated by an external source of light. The surface of the paper in the plotter is at one congugate of the imaging lens 32, and the image of the paper at the other congugate is made to coincide with the position of the image on the pre-existing transparent photographic medium 34 to be rephotographed by the film camera 10.

By this arrangement the surface of the paper in the plotter 30 acts as the light source for the transparent photographic medium illuminated at position 34, since the light reflected from the surface of the paper is focused at this position, and is the only light allowed to illuminate the transparent photographic medium placed at this postion. In this configuration the light valve plotter 30 acts by selectively modulating the light before it illuminates the transparent photographic medium at 34, rather than modulating the light that has already passed through the transparent photographic medium, as would be the case with the liquid crystal light valve. Any image formed on the paper in the plotter 30 is re-imaged at position 34. Since little or no light is reflected from the dark areas of the image formed on the paper, the corresponding areas of the transparent photographic medium at 34 remain unilluminated, and consequently do not register as an exposure in the corresponding areas in film camera 10.

The operation of this configuration of the present invention parallels the operation previously described, with these principle modifications: The signal from the video camera 14 and the image processing electronics 16 controls the pen positioning and actuating electronics 36 rather than the laser scan electronics 18; the pen 38 replaces the function of the laser 20 in forming the image on the light valve; the image is formed on the paper in the plotter 30 rather than on the smectic liquid crystal screen 22; and, the signal from the video camera 14 is stored as a real image on the paper in the plotter 30 rather than as electrical information in the memory of the image processing electronics 16. The sequence of operation in this embodiment of the present invention is essentially the same as the sequence of operation previously described. FIGS. 2 through 5 represent equally well the appearance of the mattes formed for subsequent images on the same frame by this embodiment of the present invention. Mattes for successive frames are formed on separate pieces of paper or on separate areas of a roll of paper, and are precisely repositioned in their original locations in the plotter light valve as successive frames are reproduced by film camera 10.

Both high and low contrast images can be formed on the paper in the plotter light valve 30, and this configuration can therefore be used in both the image compositing and the contrast control modes of operation previously described.

It will be understood that various changes and modifications can be made in the details of apparatus and use without departing from the spirit of the invention, especially as defined in the following claims.

I claim:

1. A system for creating traveling mattes for special-effects cinematography comprising:
   (a) photographic recording means for recording an image:
   (b) electronic camera means:
   (c) means for transmitting said image to said electronic camera means so that the photographic recording means and the electronic camera means receive the same image;
   (d) light valve means for selectively modulating the light received by said photographic recording means;
   (e) means for generating an image on said light valve means whereby the light received by said photographic recording means is selectively modulated; and,
   (f) control means for controlling said means for generating an image responsive to said camera means whereby the image received by said electronic camera means can be transmitted to said light valve means to modulate the light received by said photographic recording means.

2. A system as defined in claim 1 wherein the photographic recording means includes a photographic camera.

3. A system as defined in claim 1 wherein the electronic camera means includes a high-resolution, black-and-white video camera.

4. A system as defined in claim 1 wherein the light valve means includes a laser addressed smectic liquid crystal light valve.

5. A system as defined in claim 1 wherein the light valve means includes a high-resolution graphic plotter device.

6. A method for creating combined images in cinematography comprising the steps of:
   (a) photographing a first image with photographic recording means and sensing said first image by electronic camera means;
   (b) electronically processing said first image from said electronic camera means and storing electronic signals or real images corresponding to said first image;
   (c) photographing on the same film a successive image with said photographic recording means;
   (d) simultaneously transmitting to light valve means said electronic signal to produce a high-contrast negative image corresponding to said first image whereby said successive image is combined with said first image.

7. A system as defined in claim 6 wherein the photographic recording means is a photographic camera and the electronic camera means includes a high-resolution, black-and-white video camera.

8. A system as defined in claim 6 wherein the light valve includes a smectic liquid crystal light valve.

9. A system as defined in claim 6 wherein the light valve includes a graphic plotter device.

* * * * *